United States Patent
Veanes et al.

(10) Patent No.: US 8,515,891 B2
(45) Date of Patent: Aug. 20, 2013

(54) SYMBOLIC FINITE AUTOMATA

(75) Inventors: Margus Veanes, Bellevue, WA (US); Jonathan Paul de Halleux, Seattle, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/950,586

(22) Filed: Nov. 19, 2010

(65) Prior Publication Data

US 2012/0130932 A1    May 24, 2012

(51) Int. Cl.
*G06F 17/00*    (2006.01)
*G06N 5/02*    (2006.01)

(52) U.S. Cl.
USPC ............................................. 706/46

(58) Field of Classification Search
USPC ............................................. 706/46
See application file for complete search history.

(56) References Cited

U.S. PATENT DOCUMENTS

| | | | |
|---|---|---|---|
| 6,363,380 B1 * | 3/2002 | Dimitrova | 707/740 |
| 7,512,634 B2 | 3/2009 | McMillen | |
| 8,103,495 B2 * | 1/2012 | Veanes et al. | 703/22 |
| 8,180,786 B2 * | 5/2012 | Veanes et al. | 707/759 |
| 8,387,016 B2 * | 2/2013 | Tillmann et al. | 717/124 |
| 8,387,021 B2 * | 2/2013 | Vanoverberghe et al. | 717/126 |
| 2005/0273450 A1 | 12/2005 | McMillen | |
| 2007/0033443 A1 | 2/2007 | Tillmann | |

OTHER PUBLICATIONS

Solving Extended Regular Constraints Symbolically—Published Date: 2009 http://research.microsoft.com/pubs/117753/MSRTR2009177.pdf.
Symbolic Context-Bounded Analysis of Multithreaded Java Programs—Published Date: Aug. 2008 http://spinroot.com/spin/Workshops/ws08/spin2008_submission_23.pdf.
Model Checking PSL Safety Properties—Published Date: 2009 http://www.tcs.hut.fi/~tlauniai/TKK-ICS-R17.pdf.
Generalized Symbolic Execution for Model Checking and Testing—Published Date: 2003 http://sdg.csail.mit.edu/pubs/2003/GSE.pdf.
Parameterized Unit Testing with Microsoft Pex—Published Date: Apr. 2009 http://research.microsoft.com/en-us/projects/pex/pextutorial.pdf.
Matching with Regular Constraints—Published Date: 2005 http://www2.score.cs.tsukuba.ac.jp/publications/published_articles/publications/KutsiaMarin05TR-Published.pdf.
Symbolic Query Exploration—Published Date: May 2009 http://research.microsoft.com/pubs/80959/qex.pdf.

* cited by examiner

*Primary Examiner* — Michael B Holmes
(74) *Attorney, Agent, or Firm* — Gonzalez Saggio & Harlan LLP

(57) ABSTRACT

Described are symbolic finite automata for symbolically expressing and analyzing regular expression constraints, such as for use in program analysis and testing. A regular expression or pattern is transformed into a symbolic finite automaton having transitions that are labeled by formulas that denote sets of characters (rather than individual characters). Also described is composing two or more symbolic finite automata into a resulting symbolic finite automaton that is fully satisfiable. A constraint solver may be used to ensure satisfiability.

20 Claims, 5 Drawing Sheets

SYMBOLIC FINITE AUTOMATA

BACKGROUND

Automata, or state machines, represent states, actions and transitions between those states. Automata are often used with computer programs to represent the states, actions and transitions of a part of the program, and may be used in various ways, such as to express validity constraints on strings, including in the context of program analysis and parameterized unit testing of code.

By way of example, consider testing how a program processes a pattern, such as by inputting various strings that need to match string constraints of the pattern. A typical problem is to efficiently solve such constraints, possibly in combination with other constraints. Automata may be used in generating such test strings.

Such constraints are common, and occur in many different contexts, such as unit testing of code, database query analysis, web applications, and so forth. For example, automata may be used in the context of symbolic analysis of database queries, where like-patterns are a kind of expressions that are common in SQL select-statements. Other uses of automata are well known.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a regular expression or pattern may be processed into a symbolic finite automaton, including labeling a transition by a formula representing a set of characters corresponding to a character range. The symbolic finite automaton may be combined with at least one other symbolic finite automaton into a composed symbolic finite automaton, including checking satisfiability.

In one aspect, the symbolic finite automaton may be used to produce output data, such as by performing a random walk on the symbolic finite automaton. Binary decision diagrams may be used to represent the formulas, e.g., corresponding to the character ranges.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards symbolic representations of finite automata. In symbolic finite automata, each automaton's transitions/moves are labeled by formulas representing sets of characters (in contrast to prior finite automata techniques that use only individual characters).

In one implementation, a regular pattern, or regex (regular expression), is translated into a symbolic finite automaton. For example, a given .NET regex r (.NET regular expression pattern) or an SQL LIKE pattern can be converted into an equivalent representation as a symbolic finite automaton $A_r$. As will be understood, this symbolic finite automaton representation is well suited for representing constraints over r, and can be used efficiently to solve such constraints. Also described is the composition of symbolic finite automata for combining constraints, and the use of a solver and/or Binary Decision Diagrams (BDDs) in generating data based upon symbolic finite automata.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
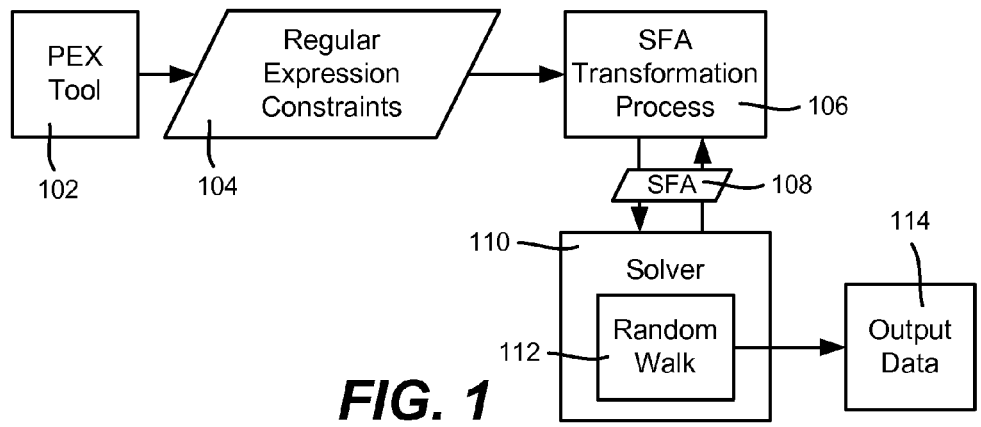
FIG. 1 is a block diagram representing example components for transforming regular expressions or patterns into symbolic finite automata, which may be processed to produce output data.

FIG. 1 shows a block diagram in which a PEX tool 102 generates regular expression constraints 104 (regular patterns) such as using a REGEX language (used in the context of a programming language like C#), to provide constraints for generating test data, such as matching strings to validate input handling by the code. REGEX is described in MSDN, ".NET Framework Regular Expressions," 2009, http://msdn.microsoft.com/en-us/library/hs600312.aspx. By way of a simple example, a regular expression to evaluate a dashed ten digit telephone number may be represented as: ^\d{3}-\d{3}-\d{3}-\d{4}$, where ^ represents the start of the string, \d{3} represents any three digits (or similarly \d{4} represents any four digits) and $ represents the end of the string.

A symbolic finite automata transformation mechanism/process 106 transforms the regular expression into a symbolic finite automaton (SFA) 108 as described herein. This may include the use of a solver 110 (e.g. an SMT solver such as the known Z3 solver, a SAT solver, or a custom solver) to keep the symbolic finite automata 108 clean, as described below. A random walk mechanism 112 (shown as part of the solver 110 but which may be an independent process) uses the symbolic finite automata 108 to generate output data 114 as also described below.

The translation from a regex to an SFA is based upon a known, standard algorithm for converting a standard regular expression into a finite automaton with epsilon moves, as generally described in the reference by J. E. Hoperoft and J. D. Ullman, entitled "*Introduction to Automata Theory, Languages, and Computation*" (Addison Wesley, 1979). However, in symbolic finite automata, moves are labeled by formulas representing sets of characters rather than individual characters, and thus character ranges (and negations) use a translation that creates a corresponding formula.

More particularly, a representation of finite automata is used, where several transitions from a source state to a target state are combined into a single symbolic move. Formally, a collection of transitions $(p, a_1, q), \ldots, (p, a_n, q)$ are represented by a single (symbolic) move $(p, \phi, q)$ from p to q, where $\phi \in \mathcal{F}_c$ ($\mathcal{F}$ denotes the set of all formulas without uninterpreted function symbols and at most one fixed free variable of fixed character sort $c$), such that $[\![\phi]\!] = \{a_1, \ldots a_n\}$, where $$[\![\phi]\!] \stackrel{def}{=} \{a | a \in u_c, \models \phi[a]\}.$$

(and u represents some universe of values),
Let $$[\![(p,\phi,q)]\!] \stackrel{def}{=} \{(p,a,q) | a \in [\![\phi]\!]\},$$

and given a set $\Delta$ of moves, let $$[\![\Delta]\!] \stackrel{def}{=} \{\tau | \delta \in \Delta, \tau \in [\![\delta]\!]\}.$$

Note that that $[\![p, \phi, q]\!] = 0$ if and only if $\phi$ is unsatisfiable. Further, define:

$$\text{Source}((p,\phi,q)) \stackrel{def}{=} p,$$

$$\text{Target}((p,\phi,q)) \stackrel{def}{=} q,$$

$$\text{Cond}((p,\phi,q)) \stackrel{def}{=} \phi.$$

For example, the move $(p, a \leq \chi \wedge \chi \leq z, q)$ represents the set of all transitions (p, c, q) where c is a character between a and z.

A symbolic finite automaton is a tuple $(Q, q_0, F, \Delta)$, where Q is a finite set of states, $q_0 \in Q$ the initial state, $F \subset Q$ is the set of final states, and $\Delta: Q \times \mathcal{F}_c \times Q$ is the move relation. The symbol A may be used as a subscript to identify its components.

As with finite automata, it is often useful to add epsilon moves to symbolic finite automata. Consider a special symbol $\epsilon$ that is not in the background universe. An SFA with epsilon moves, or $\epsilon$SFA, is a tuple $(Q, q_0, F, \Delta)$, where Q, $q_0$ and F are as set forth above, and $\Delta: Q \times (\mathcal{F}_c \cup \{\epsilon\}) \times Q$. As used herein, the term "SFA" without the additional qualification allowing epsilon moves implies that epsilon moves do not occur; (note that any SFA is thus also an $\epsilon$SFA.) Let $[\![(p, \epsilon, q)]\!] \stackrel{def}{=} (p, \epsilon, q)$. An $\epsilon$SFA $A = (Q, \Delta, q_0, F)$ denotes the finite automaton $[\![A]\!]$ with epsilon moves, where $$[\![A]\!] \stackrel{def}{=} (Q, u^C, [\![\Delta]\!], q_0, F).$$

The set of all epsilon moves in $\Delta_A^\in$ is represented as $\Delta_A$ and $\Delta_A^{\notin}$ for $\Delta \Delta_A \backslash \Delta_A^\in$.

An $\epsilon$SFA A is normalized if there are no two distinct moves $(p, \phi_1, q)$, $(p, \phi_2, q)$ in $\Delta_A^{\notin}$. For any $\in$SFA A there is a normalized SFA A' such that $[\![A]\!] = [\![A']\!]$: for all states p and q in $Q_A$, a disjunction $\phi$ is made of all the conditions of the moves from p to q in $\Delta_A^{\notin}$ and let $(p, \phi, q)$ be the single move in $\Delta_A^{\notin}$ that goes from p to q. A move is satisfiable if its condition is satisfiable. Note that unsatisfiable moves can be omitted.

An $\epsilon$SFA A is referred to herein as "clean" if all moves in $\Delta_A^{\notin}$ are satisfiable. An SFA A is referred to herein as "deterministic" (called DSFA) if $[\![A]\!]$ is deterministic. Note that it is equivalent to state that A is deterministic, or that for any two moves $(p, \phi_1, q_1)$ and $(p, \phi_2, q_2)$ in $A_A$, if $q_1 \neq q_2$, then $\phi_1 \wedge \phi_2$ is unsatisfiable.

The language (set of strings) accepted by an SFA A, L(A), is the language accepted by the finite automaton $[\![A]\!]$. Two SFAs may be referred to as equivalent if they accept the same language. A DSFA A is referred to as minimal if A is normalized, clean, and $[\![A]\!]$ is minimal. Note that if a DSFA A is minimal, then it is unique up to logical equivalence of conditions and renaming of states.

Figure 2:
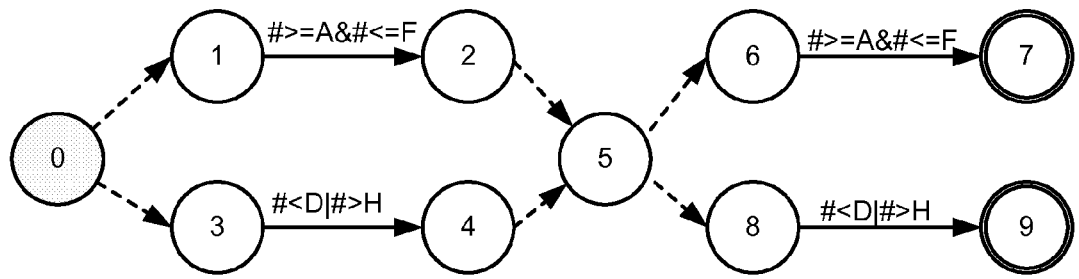
FIG. 2 is a representation of an example epsilon symbolic finite automaton (εSFA) used in producing a corresponding symbolic finite automaton.
Figure 3:
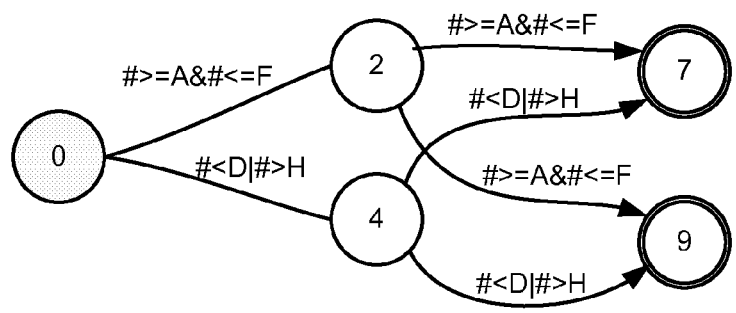
FIG. 3 is a representation of the example corresponding symbolic finite automaton processed from the εSFA of FIG. 2.

A sample regex and corresponding $\epsilon$SFA are represented in FIG. 2, in which the initial state is grey, the epsilon moves are dashed, the symbol & is used for conjunction and the symbol | is used for disjunction. As described below, a corresponding SFA is represented in FIG. 3, and is obtained by various processing algorithms, including epsilon elimination, determinization of SFAs to obtain DFSAs, and minimization of DSFAs. Also described is the concept of composing SFAs via the product of SFAs.

With respect to epsilon elimination, the input to the algorithm is an $\in$SFA A and the output is a corresponding SFA B; A is assumed to be normalized. The known notion of the epsilon closure of a state q in A is used, denoted herein by $\in C(q)$. The following sets forth one epsilon elimination algorithm:

(i) For all $q \in Q_A$ compute $\epsilon C(q)$ as the least subset of $Q_A$ such that $q \in \epsilon C(q)$, and if $q1 \in \epsilon C(q)$ and $(q1, \epsilon, q2) \in \Delta_A$ then $q2 \in \epsilon C(q)$.

(ii) Compute a partial map E from $Q_A \times Q_A$ to $\mathcal{F}_c$ such that, for all $(q, \_, r) \in \Delta_A^{\notin}$, $$E(q,r) = \vee \{\phi | \exists p (p \in \epsilon C(q), (p, \phi, r) \in \Delta_A^{\notin})\}.$$

(iii) View Dom(E) as a directed graph and eliminate all edges and states that are not reachable from $q_{0A}$.

(iv) Let B have the following components:

$$Q_B = \{p, q | (p, q) \in Dom(E)\};$$

$$q_{0B} = q_{0A};$$

$$F_B = \{q | q \in Q_B, \epsilon C(q) \cap F_A \neq \emptyset\};$$

$$\Delta_B = \{(p, E(p,q), q) | (p,q) \in Dom(E)\}.$$

Note that step (iii) is not necessary but eliminates states and moves that are redundant; often half of the original states are redundant. The algorithm can be implemented in time linear in the size of A. For example the epsilon closures can be represented by shared linked lists. The result of applying the algorithm to the $\epsilon$SFA in FIG. 2 is illustrated in FIG. 3.

With respect to determinization, the input to the algorithm is an SFA A and the output is an equivalent DSFA B; A is assumed to be normalized. Determinization uses the following notations:

$$\Delta_A(q) \stackrel{def}{=} \{t | t \in \Delta_A, \text{Source}(t) = q\}$$

$$\Delta_A(\bar{q}) \stackrel{def}{=} \cup \{\Delta_A(q) | q \in \bar{q}\}$$

$$\text{Target}(\bar{t}) \stackrel{def}{=} \cup \{\text{Target}(t) | t \in \bar{t}\}$$

It is convenient to describe the algorithm as a depth-first search algorithm using a stack S of B states as a frontier, a set V of visited B states, and a set T of moves:

(i) Initially S=({q_{0A}}), V ={{q_{0A}}}, and T=0.
(ii) If S is empty proceed to (iv) else pop q from S.
(iii) For each nonempty subset t of $\Delta_A(q)$, let $$\varphi_t = \left(\bigwedge_{t \in t} Cond(t)\right) \wedge \left(\bigwedge_{t \in \Delta_A(q) \setminus t} \neg Cond(t)\right)$$

If $\phi_t$ is satisfiable then
add (q, $\phi_t$, Target (t)) to T;
if Target(t) is not in V then add Target(t) to V and push Target(t) to S. Proceed to (ii).
(iv) Let B=(V , {q_{0A}}, {q∈V |q∩F_A≠0}, T).

The satisfiability check of $\phi_t$ may be performed, for example, with an SMT solver, which ensures that B is clean. Without the check, B may get cluttered with unsatisfiable moves and states that are unreachable.

With respect to minimization, the input to the algorithm is a DSFA A and the output is an equivalent minimal DSFA B; A is assumed to be normalized and clean. A is also assumed to be "total," meaning that for all a∈ε_c and all q∈Q_A there is a transition (q, a, p) in ⌊A⌋ for some p∈Q_A. To make A total, the process adds a new "dead" state d to it (a state from which no final state can be reached), adds the move (d, true, d), and from each state q such that $\phi = \bigwedge_{t \in \Delta_{A(q)}} \neg Cond(t)$ is satisfiable, adds the move (q, $\phi$, d).

(i) Initialize E to be the equivalence relation over Q_A such that E(p,q)⇔p,q ∈F_A.
(ii) If there exists (p,q) in E such that there are moves (p, $\phi$, p_1) and (q, $\psi$, q_1) in $\Delta_A$ where p_1≠q_1 and (p_1, q_1)∉E and $\phi \wedge \psi$ is satisfiable, then remove (p,q) from E and repeat (ii).
(iii) Let B have the following components:
Q_B is the set of E-classes {[q]|q∈Q_A};
q_{0B} is the E-class [q_{0A}];
F_B is the set of E-classes {[q]|q ∈F_A};
$\Delta_B$ is {([q],$\phi$, [p])|(q, $\phi$, p)∈$\Delta_A$}.
(iv) Normalize B, and if B has a dead state (a state from which no final state can be reached), eliminate all moves to the dead state and eliminate the dead state unless it is q_{0B}.

In this manner, a regular pattern or regular expression is translated into a symbolic finite automaton, in which moves are labeled by formulas representing sets of characters rather than individual characters. The translation is based upon a known, standard algorithm for converting a standard regular expression into a finite automaton with epsilon moves.

However, character sets (that do not occur in classical regular expressions) are represented implicitly by formulas instead of explicitly by individual characters. As a result, the symbolic finite automaton is kept normalized in a way that any two moves (p, $\phi$, q) and (p, $\psi$,q) are replaced by the single move (p,$\phi \vee \psi$, q). The symbolic finite automaton is kept clean in the sense that, for all moves (p,$\phi$,q), there is at least one character that satisfies $\phi$.

By way of example, the condition 'a'<x∧x<'b' is not satisfiable because there exists no character strictly between 'a' and 'b', and thus cannot appear as a condition in a move. Note that in .NET regexes, it is possible to write character sets that are infeasible; e.g. [^\d\D] translates to the infeasible condition (¬ (digit(x)∨ ¬ digit(x))); (note that there is no character x that is both a digit and a non-digit at the same time).

Figure 4:
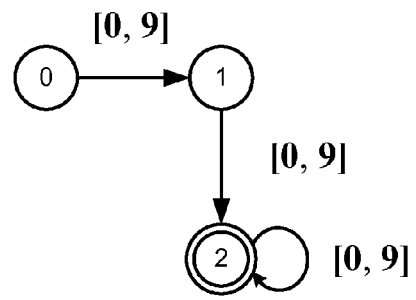
FIG. 4 is a representation of an example corresponding symbolic finite automaton configured to be random walked to produce output data.

Turning to using a symbolic finite automaton to generate output data, FIG. 4 is a simplified example of a symbolic finite automaton constructed for the regular expression that represents a sequence of any two or more digits, e.g., ∧ [0-9] {2,}$. As can be seen in FIG. 4, the transition from state zero (0) to state one (1) needs a digit between zero and nine, as does the transition from state one (1) to state two (2); state two (2) may repeat zero or more times.

In a symbolic finite automaton, each range may have a digit generated by a random walk of a binary decision diagram (BDD) representing that range. As is known, a binary decision diagram is a directed acyclic graph in which nodes at different orders (levels) are traversed to a True leaf node, with left branches representing zero and right branches representing one. Thus, a random walk of a four order BDD that represents the range from [0-9] that took a left, right, right, left branch walk through the orders results in a 0110 binary value, or six decimal. Note that a value outside of this range corresponds to a False leaf node, and thus cannot be reached by a random walk.

In the example of FIG. 4, a random walk of the symbolic finite automaton may, for example, output 642, 87, 7483296, and so on until some desired amount of data has been generated. Note that the number of times state two (2) repeats may be random or fixed, or may be limited as desired (e.g., random but no more than ten times), and any random walk or repeated state may be weighted and/or seeded as desired to produce data that matches a desired result, e.g., allow an output of two to ten digit numbers, but generate approximately half of the output as four digit numbers.

A binary decision diagram can be constructed for each range that is of significance to output generation. Indeed, Unicode has over 40,000 characters, which are too many nodes for practical implementations; however the use of ranges as described herein, which can be shared by unions and intersections of graphs, allows for practical numbers of nodes to cover the Unicode character set.

The order of nodes may have an impact on the size of the binary decision diagrams. It has been found that using the reverse order of the bits (e.g., order 0 corresponds to the most significant bit) produces smaller binary decision diagrams for typical character classes used in regexes. Notwithstanding, any order of bits may be used.

Turning to the concept of product construction, the input to the product construction algorithm comprises two SFAs; A and B, and the output is an SFA C that is the product of A and B, such that L(C)=L(A)∩L(B). Product construction may be used with random walks and/or with a constraint solver as described below.

The product construction algorithm is generally known, except for aspects of it related to the symbolic finite automata. More particularly, similar to that described above, it is convenient to describe the algorithm as a depth-first-search algorithm using a stack S of states of C as a frontier, a set V of visited states, and a set T of moves.

(i) Initially S=(⟨ q_{0A}, q_{0B}⟩ ), V={⟨⟩ q_{0A}, q_{0B}⟩ }, T=0.
(ii) (ii) If S is empty go to (iv) else pop ⟨ q_1, q_2⟩ from S.
(iii) Iterate for each t_1 ∈$\Delta_A$(q_1) and t_2 ∈$\Delta_B$(q_2), let $\phi$=Cond (t_1)^ Cond(t_2), let p_1=Target(t_1), and let p_2=Target(t_2). If $\phi$ is satisfiable then
add (⟩ q_1, q_2⟨ ), $\phi$, ⟩ p_1, p_2⟨ ) to T;
if ⟨ p_1, p_2⟩ is not in ⟨ , then add ∨ p_1, p_2⟨ to ⟩ and push ⟩ p_1, p_2⟩ to S. Proceed to (ii).
(iv) Let C=(⟨ q_{0A}, q_{0B}⟩ , V, {q ∈V|q∈F_A×F_B}, T).
(iv) Eliminate dead states from C (states from which no final state is reachable).

Note that |Q_c| is at most |Q_A|*|Q_B|. The satisfiability check in (iii) prevents unnecessary exploration of unreachable states, and may avoid a quadratic "blowup" of Q_C, whereas (v) avoids introduction of useless "dead end"-states from where no strings are accepted.

Figure 5:
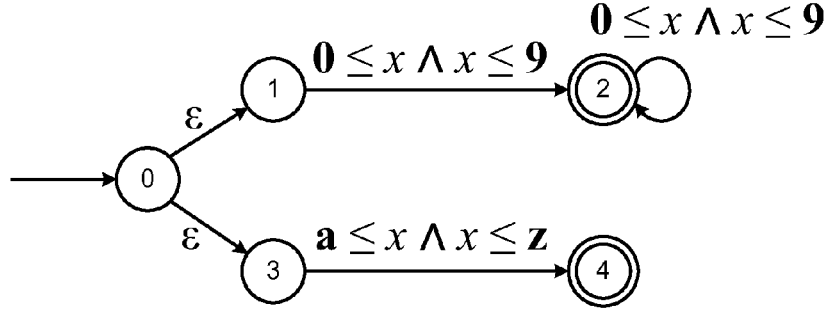
FIG. 5 shows an example of a symbolic finite automata comprising a union of two other symbolic finite automata accomplished by using ε-moves.

In a random walk scenario, random walks are performed on the symbolic finite automaton starting from the initial state and ending in some final state. Once a random walk is given, e.g., ((0,1), (1,2), (2,2), (2,2)) for the symbolic finite automaton in the example of FIG. 5, for each non-epsilon move (i,j), a character is chosen at random that satisfies the condition on the move, e.g., "327" is a concrete string generated this way for the sample random walk and is a solution for x in the constraint 'x∈\d+|[a–z]'. In this scenario, the functionality of a full SMT solver is not needed for generating the walks and for constructing the symbolic finite automaton. Binary decision diagrams thus may be used very efficiently to represent the conditions, and known binary decision diagram algorithms can be used to construct Boolean combinations of the move conditions.

However, the above scenario is generally restricted to a case of regular pattern constraints that can be reduced to intersection constraints, e.g., constraints of the form $x \in r_1 \wedge x \in r_2 \wedge \ldots \wedge x \in r_n$. Intersection constraints are combined, via composition, to a membership constraint in a single symbolic finite automaton, $x \in L(A_1 \times A_2 \times \ldots \times A_n)$ where $A_i$ is the symbolic finite automaton for $r_i$.

In an alternative, symbolic finite automaton or automata may be translated into constraints for a particular solver, depending on the task or scenario at hand. This alternative is generic and supports simultaneous solving of other constraints. To this end, a symbolic finite automaton A is translated into a set of (recursive) axioms that describe the acceptance condition for the strings accepted by A and build on the representation of strings as lists. This set of axioms is asserted to an SMT solver as the theory Th(A) of A. An assertion involving Boolean combinations of regular pattern constraints as well as any other constraints supported by the SMT solver (such as arithmetical constraints or length constraints on strings) can be solved simultaneously by using the functionality of the SMT solver.

Thus, in addition to a quantifier free goal formula that is provided to an SMT solver and for which proof of (or absence of) satisfiability is sought, additional universally quantified axioms may be asserted to the solver, e.g., via the programmatic API of the solver. Such axioms may be used to encode language acceptors for εSFAs. During proof search, axioms are triggered by matching subexpressions in the goal; example kinds of axioms that may be used are equivalences of the form:

$$\forall \overline{\chi}(\phi lhs \Leftrightarrow \phi rhs)$$

The axioms are used as "rewrite rules", and each application of an axiom preserves the logical equivalence to the original goal. As long as there exists an axiom that can be triggered, then triggering is guaranteed. Thus, termination is in general not guaranteed when (mutually) recursive axioms are being used.

Figure 6:
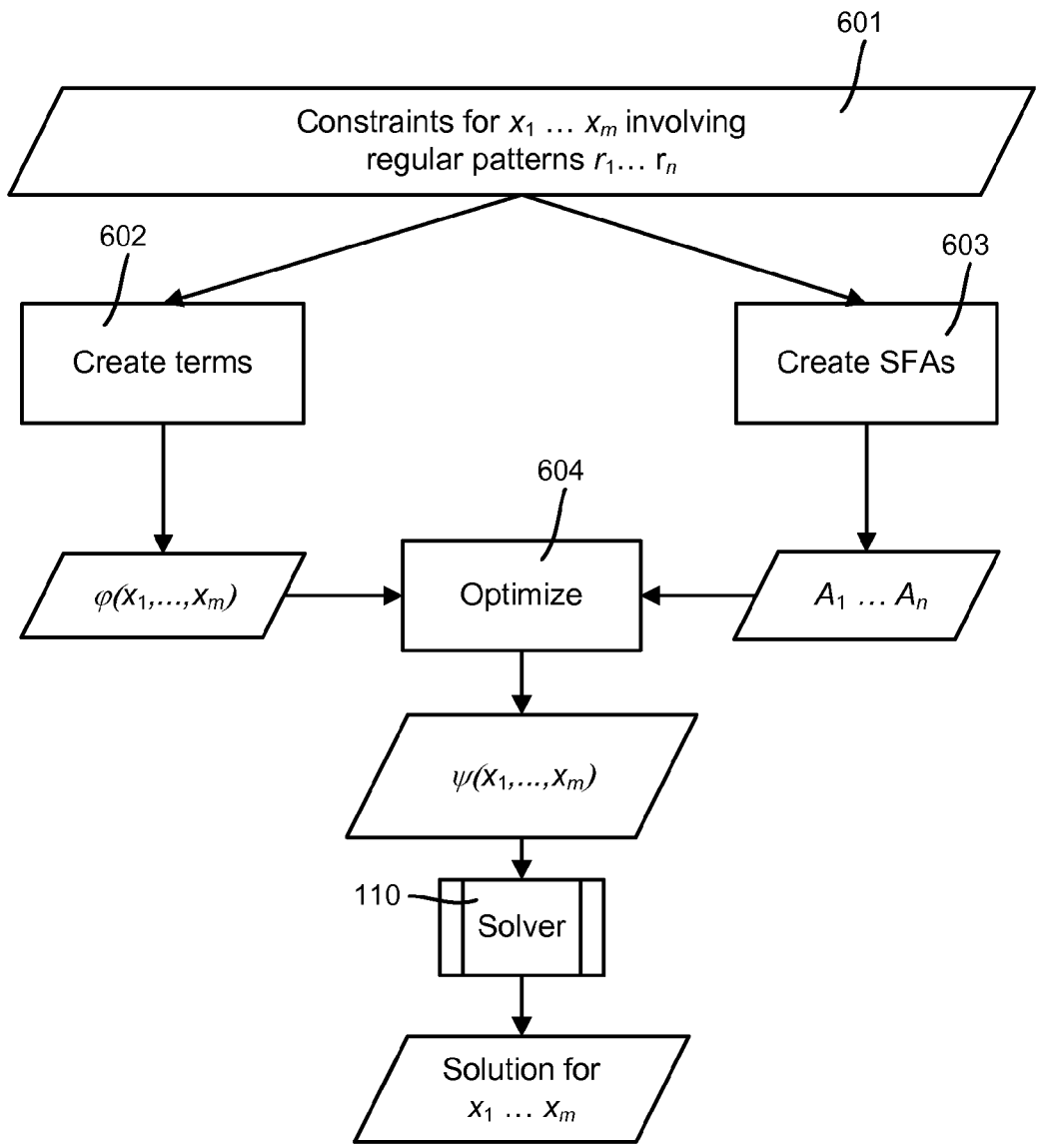
FIG. 6 is a flow diagram showing an example use of symbolic finite automata for solving constraints that involve regular patterns.

FIG. 6 is a flow diagram summarizing various steps 601-604 described above, when given a set of constraints and patterns at step 601. The exemplified steps include creating terms (step 602) and SFAs (step 603), and optimizing at step 604. As can be seen, a solver is used in this example to obtain the solution for the constraints.

Figure 7:
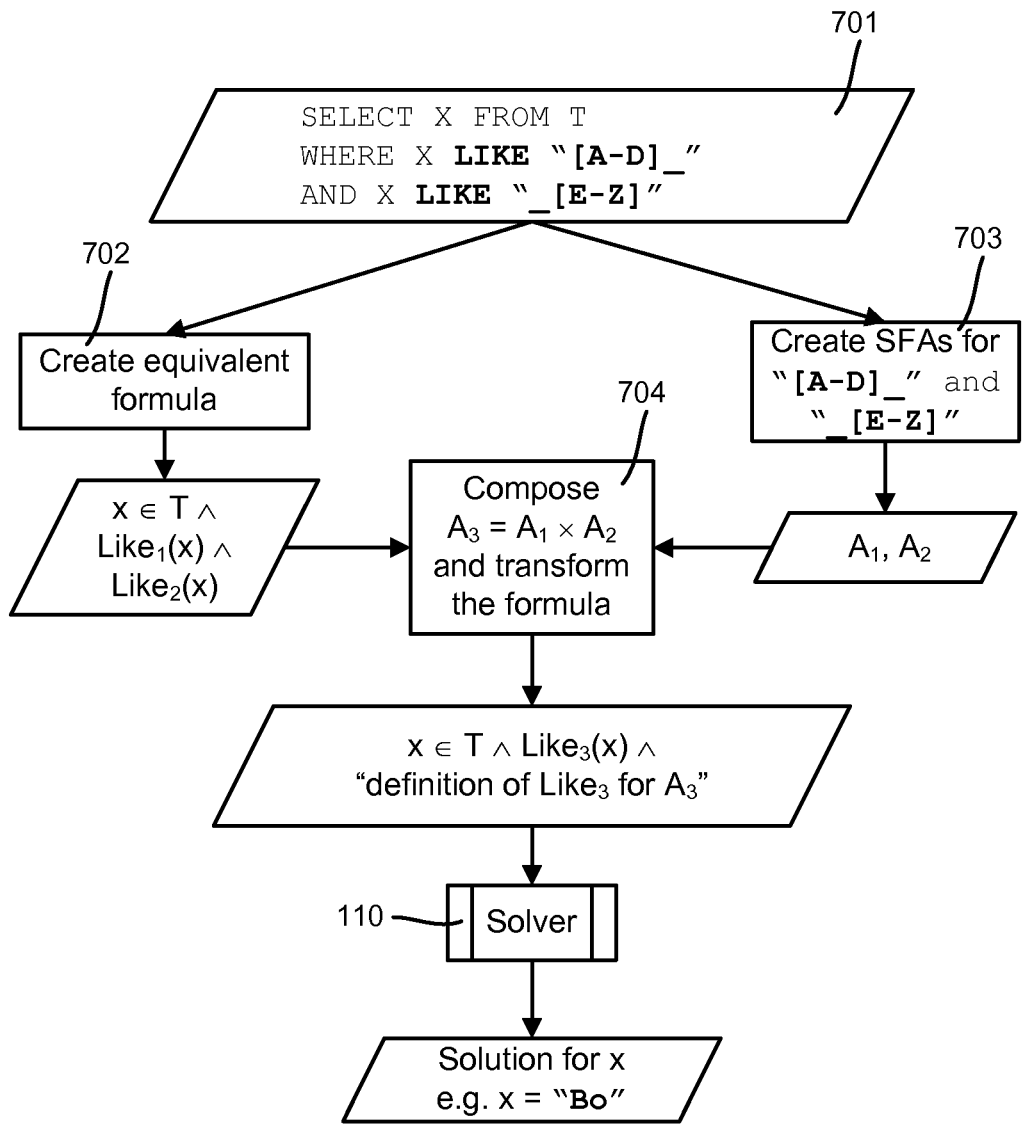
FIG. 7 is a flow diagram showing the example steps of FIG. 6 applied to a SQL query involving LIKE patterns (which are kinds of regular expressions).

FIG. 7 is a flow diagram representing how the steps of FIG. 6 apply on a SQL query involving LIKE patterns (that are special regular expressions). The query (step 701) is translated (step 702) into an equivalent term that uses the SFAs (created at step 703) to encode the pattern constraints. The optimization at step 704 composes two SFAs into a single composite SFA. The example application here is to generate T, i.e., where the content of T is not given, but is synthesized from the solution or solutions.

As can be seen, there is described the converting of a regular expression (or similar regular pattern, such as a LIKE pattern) into a symbolic finite automaton. Character ranges are represented as formulas in transitions, while keeping the symbolic finite automaton clean, that is, the SFA has no transitions where the label is unsatisfiable (denotes the empty set of characters). Two or more symbolic finite automata may be composed in a way that keeps the resulting composed symbolic finite automaton clean. This composition algorithm generally avoids unnecessary blowup of the size of the resulting symbolic finite automaton (and consequently improves the performance as much as by an order of magnitude). An external constraint solver may be used incrementally during the construction of the symbolic finite automaton to maintain that the resulting symbolic finite automaton is clean and/or to make Boolean combinations of labels (character formulas) during the construction.

Exemplary Operating Environment

Figure 8:
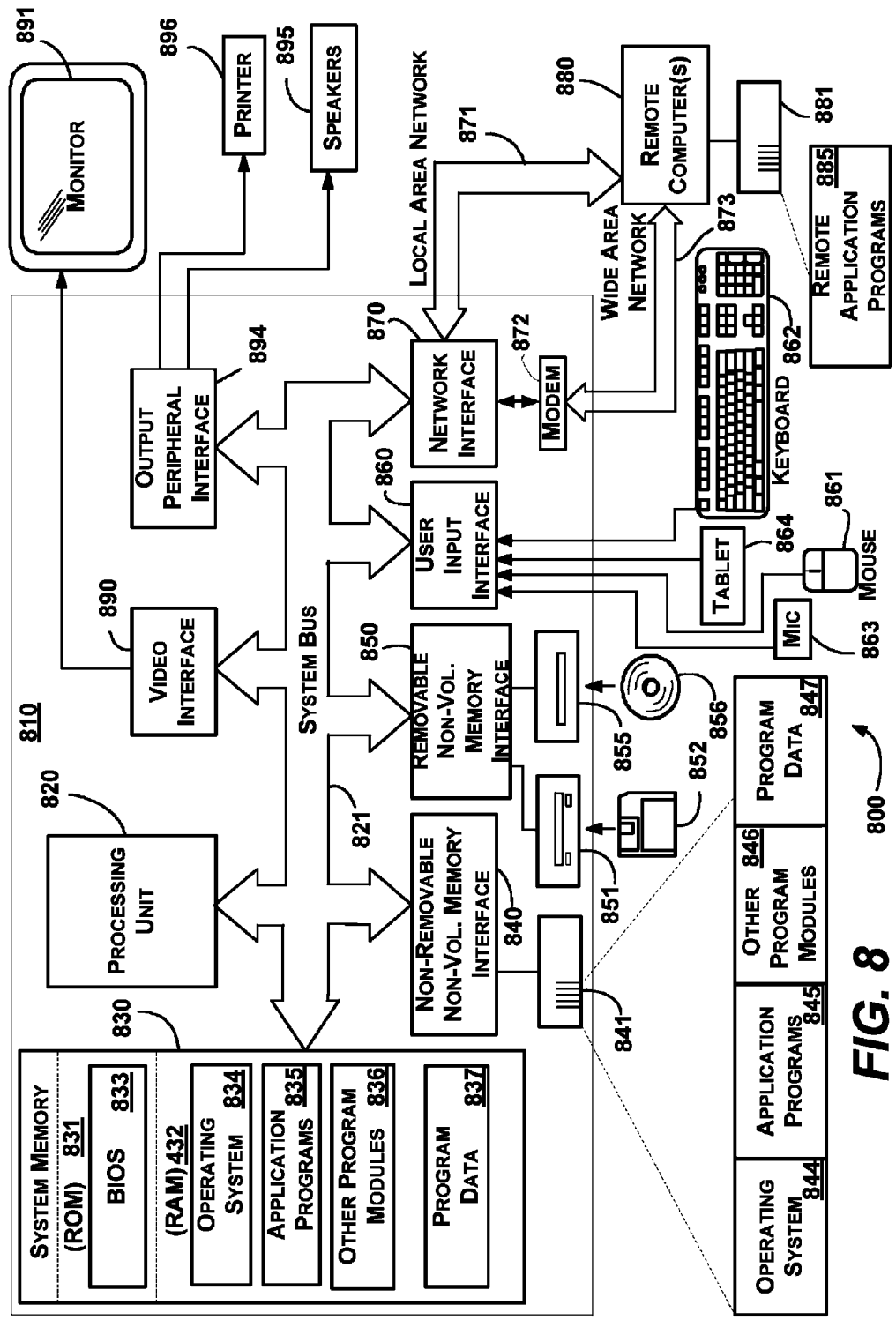
FIG. 8 shows an illustrative example of a computing environment into which various aspects of the present invention may be incorporated.

FIG. 8 illustrates an example of a suitable computing and networking environment 800 on which the examples of FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, comprising processing a regular expression or pattern into a symbolic finite automaton, including labeling a transition by a formula representing a set of characters corresponding to a character range.

2. The method of claim 1 wherein processing the regular expression or pattern into the symbolic finite automaton comprises, performing epsilon elimination on an epsilon symbolic finite automaton obtained from processing the regular expression, performing determinization to obtain a deterministic symbolic finite automata, and performing minimization on the deterministic symbolic finite automaton to obtain a minimal deterministic symbolic finite automaton.

3. The method of claim 1 further comprising, composing the symbolic finite automaton and at least one other symbolic finite automaton into a composed symbolic finite automaton.

4. The method of claim 3 wherein composing the symbolic finite automaton and at least one other symbolic finite automaton into a composed symbolic finite automaton comprises performing a product of symbolic finite automata, including checking satisfiability.

5. The method of claim 3 wherein composing the symbolic finite automaton and at least one other symbolic finite automaton into a composed symbolic finite automaton comprises eliminating dead states.

6. The method of claim 1 further comprising, performing a random walk on the symbolic finite automaton to produce output data.

7. The method of claim 6 wherein the formula representing the set of characters is represented by a binary decision diagram, and wherein performing the random walk comprises traversing the binary decision diagram.

8. The method of claim 7 further comprising, configuring the binary decision diagram with order zero corresponding to a most significant bit.

9. In a computing environment, a method performed at least in part on at least one processor, comprising, constructing a symbolic finite automaton, including labeling a transition by a formula, and maintaining the symbolic finite automaton such that the transition has a satisfiable formula.

10. The method of claim 9 wherein maintaining the symbolic finite automaton comprises incrementally using an external constraint solver to maintain that the transition has a satisfiable formula.

11. The method of claim 9 further comprising using an external constraint solver to provide Boolean combinations of a plurality of formulas.

12. The method of claim 9 wherein constructing the at least one symbolic finite automaton comprises processing a regular expression or pattern into an epsilon symbolic finite automaton, performing epsilon elimination on the epsilon symbolic finite automaton, performing determinization to obtain a deterministic symbolic finite automata, and performing minimization on the deterministic symbolic finite automaton to obtain a minimal deterministic symbolic finite automaton.

13. The method of claim 9 further comprising, composing the symbolic finite automaton and at least one other symbolic finite automaton into a composed symbolic finite automaton.

14. The method of claim 13 wherein composing the symbolic finite automaton includes checking satisfiability.

15. The method of claim 9 further comprising, accessing a binary decision diagram corresponding to the formula, and performing a random walk on the binary decision diagram to produce output data.

16. The method of claim 15 further comprising, configuring the binary decision diagram with order zero corresponding to a most significant bit.

17. The method of claim 15 further comprising, configuring the binary decision diagram to represent part of the Unicode character set.

18. One or more computer-readable storage media having computer-executable instructions, which when executed perform steps, comprising:
constructing a first symbolic finite automaton;
constructing a second symbolic finite automaton; and
composing a resulting symbolic finite automaton that is a product of the first symbolic finite automaton and the second symbolic finite automaton.

19. The one or more computer-readable storage media of claim 18 having further computer-executable instructions comprising, incrementally checking satisfiability while composing the resulting symbolic finite automaton.

20. The one or more computer-readable storage media of claim 18 having further computer-executable instructions comprising, processing the resulting symbolic finite automaton to generate output data.

* * * * *